Nov. 5, 1963   W. KUHN ETAL   3,109,870
EXTRACTION METHOD FOR SEPARATING AT LEAST ONE COMPONENT
OF A PHASE CONSISTING OF A MIXTURE OF SUBSTANCES
Filed Feb. 19, 1959   2 Sheets-Sheet 1
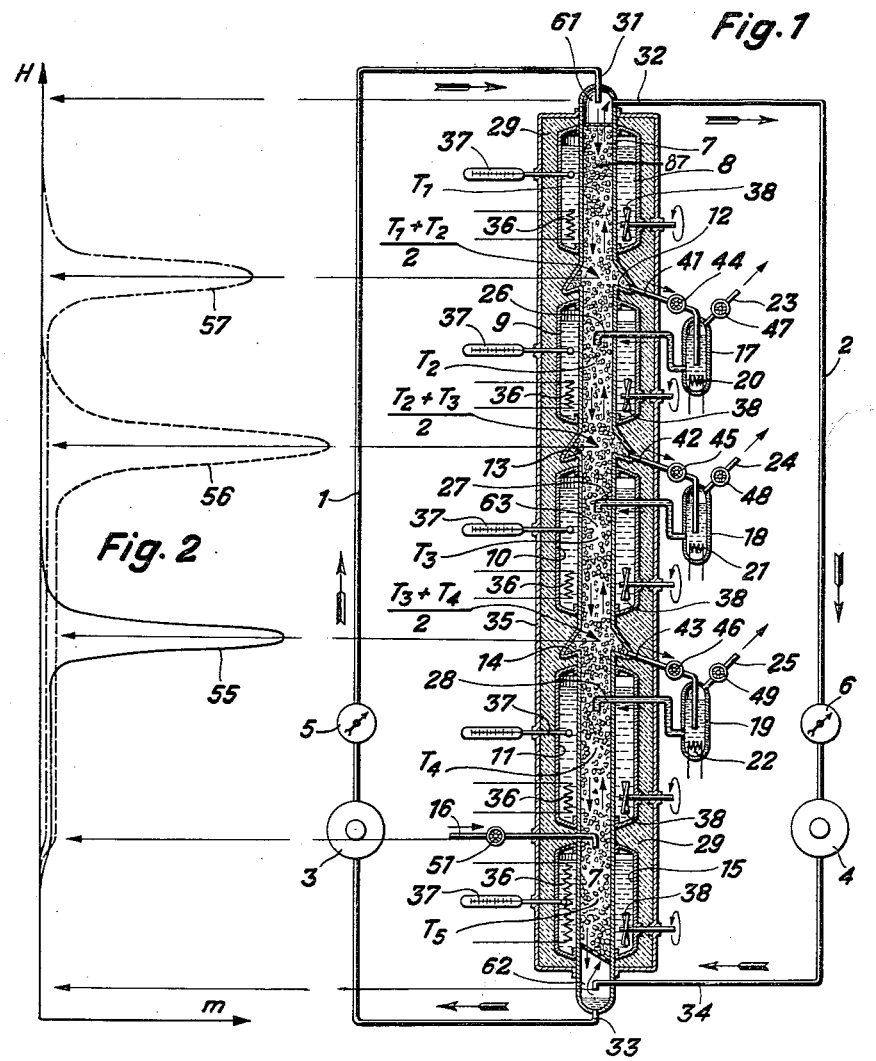
Inventor:
WERNER KUHN
MAX THÜRKAUF
By K. A. Mayr
ATTORNEY

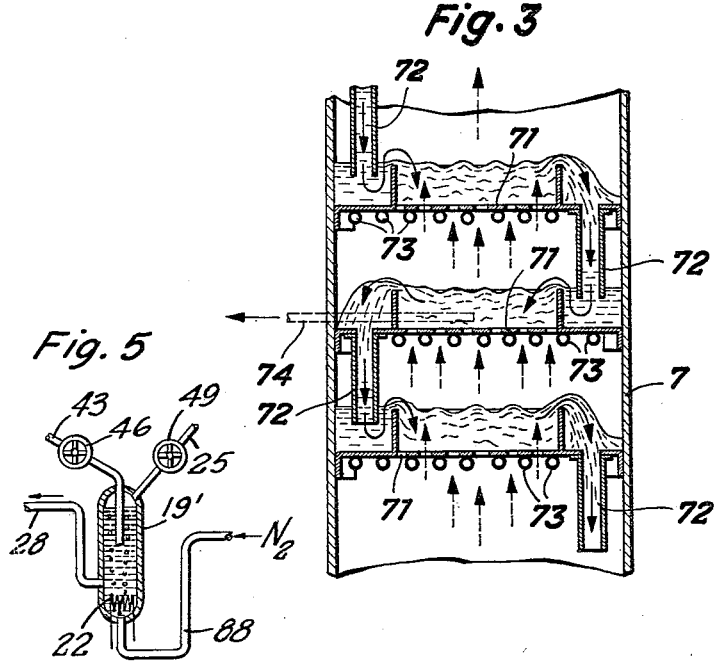
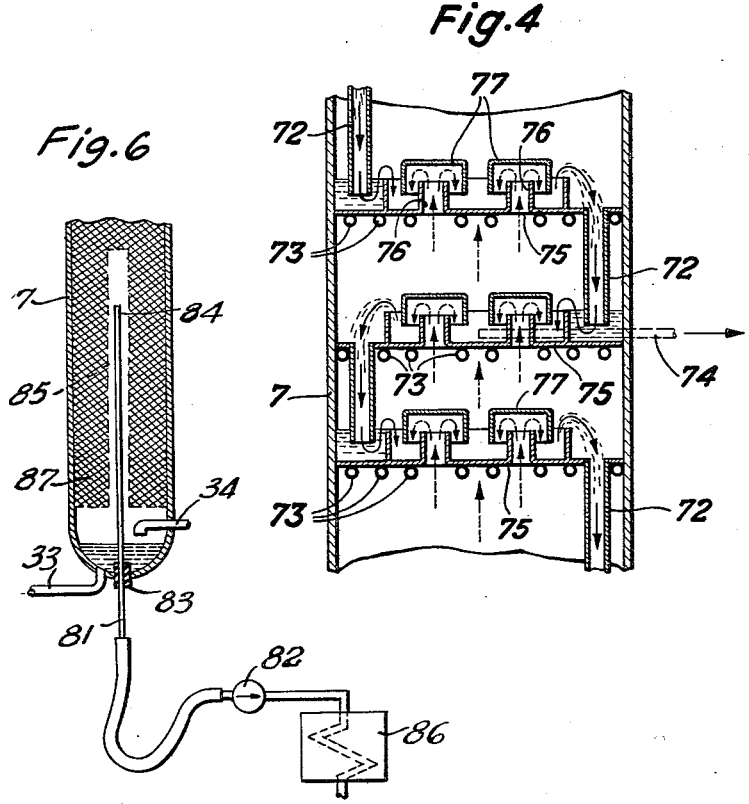

United States Patent Office 3,109,870
Patented Nov. 5, 1963

3,109,870
EXTRACTION METHOD FOR SEPARATING AT LEAST ONE COMPONENT OF A PHASE CONSISTING OF A MIXTURE OF SUBSTANCES
Werner Kuhn and Max Thürkauf, Basel, Switzerland, assignors to Sulzer Freres, S.A., Winterthur, Switzerland, a corporation of Switzerland
Filed Feb. 19, 1959, Ser. No. 834,367
Claims priority, application Switzerland Feb. 21, 1958
2 Claims. (Cl. 260—705)

The present invention relates to an extraction method for separating at least one component from a mixture of substances which are in the liquid or gas phase whereby the mixture is conducted through at least one conduit of a substance exchange device, a substance or mixture of substances in the liquid or gas phase being conducted in counterflow relation through the same conduit, the component or components to be separated being soluble in each of the counterflowing substances and being soluble in at least one of the two counterflowing substances or mixture of substances in dependence of the temperature. The invention also refers to an apparatus for performing the method according to the invention and having at least one exchange conduit. In contradistinction to distillation, a fundamental feature of the extraction method according to the invention is the flow of two different substances or mixtures of substances in counterflow relation whereby the substances to be separated are soluble in each of the counterflowing substances.

The word "phase" used in the present specification and in the claims denotes a homogenous system having no macroscopic surfaces where physical-chemical discontinuities may occur. The system water-ice, for example, has two phases. There is a surface separating the water from the ice where there are physical-chemical discontinuities, for example, where the electric conductivity does not change continuously but discontinuously. Another two-phase system is the system water-mercury in which the phases are liquid but not miscible. The boundary surface between water and mercury is a locus of physical-chemical discontinuities where, for example, the density changes discontinuously. A third example of a two-phase system is paraffin oil-nitrogen wherein the paraffin oil is one phase which is liquid and wherein the nitrogen is the second phase which is gaseous.

If one or more substances, for example some gaseous fatty acids, perhaps propionic acid, normal butyric acid, and normal valeric acid are admixed to one phase of the two-phase system, for example to the nitrogen of the last mentioned system, the mixture may form one of the two phases used in the method according to the invention for separating at least one component, for example, the propionic acid. The second phase is formed, for example, by the paraffin oil or a mixture of paraffin oil and liquid propionic acid, normal butyric acid and normal valeric acid. The component to be separated, for example the propionic acid, must be soluble in both phases whereby the solubility in at least one phase must be dependent on the temperature. In the aforedescribed example the solubility of the propionic acid in the paraffin oil depends on the temperature. The vaporized propionic acid is miscible with the nitrogen.

In the method according to the invention such a temperature drop is maintained along the substance exchange conduit that at the ends of the conduit the product of the concentration of the component to be separated in the phase which flows towards the center of the conduit and the volume of that phase flowing per time unit through the conduit is greater than the product of the concentration of the component to be separated in the phase which flows from the center of the conduit and the volume of the last mentioned phase flowing per time unit through the conduit in opposite direction to the first phase.

A component of at least one of the phases flowing in opposite directions through the conduit is separated and removed through a removal device which is connected to a point of the substance exchange conduit where the amount of the component to be separated flowing per time unit in one of the phases is equal to the amount of the component to be separated flowing per time unit in the other phase which flows in opposite direction to the first phase.

The amount of a component transported in a phase per time unit is equal to the product of the relative concentration of the component in the phase which concentration is measured, for example in percents by weight, and the volume of this phase flowing through the exchange conduit per time unit. If desired, the temperature drop can be subdivided. In the apparatus according to the invention the conduit in which the two phases flow in opposite directions is provided with heating means for producing the desired temperature drop in the conduit and means are provided for constant supply and withdrawal of both phases to and from the conduit, a device being connected with the conduit within the desired temperature drop for removing the component to be separated.

The process according to the invention is based on the fact that the solubility of the components to be separated in at least one of the two phases depends on the temperature. The solubility may be defined by the amount in grammes of the component to be separated which is dissolved in both phases, particularly in the liquid phase, at 100° C. and 1 atmosphere absolute. If a certain temperature drop is maintained along the substance exchange conduit and if both phases are conducted at constant velocities through the conduit so that the amount of matter flowing through the conduit per time unit is constant, the amount of the component to be separated and carried along per time unit by the two phases changes throughout the length of the conduit, due to the different temperatures in different parts of the conduit and the temperature dependability of the solubility of the component to be separated.

There is a favorable or optimal cross section of the conduit for each component to be separated. In this cross section the two phases transport, per time unit, an equal amount of the same component. Away from this optimal crosssection—for example in a vertical conduit at a cross section above the optimal cross section—the phase flowing towards the optimal cross section carries more, for example 70% of the total amount of component transported by the two phases per time unit, whereas the phase flowing away from the optimal cross section carries only 30% of the total amount of the component so that, for example, above the optimal cross section always a greater portion of the component to be separated is conducted towards the optimal cross section than is conducted away from this cross section. On the other side of the optimal cross section, for example below the favorable cross section in a vertical conduit, the second phase which flows towards the optimal cross section carries 70% per time unit of the total amount of the component to be separated and carried by the two phases, whereas the first phase which flows from the optimal cross section carries only 30% of the component to be separated. Also at this point of the conduit a greater portion of the component is continuously transported towards the optimal cross section than is carried away from this cross section. The component to be separated is concentrated at the optimal cross section of the conduit where both phases carry the same amount per time unit of the component to be separated.

Other components to be separated will be concentrated under equal conditions whereby the optimal zones or cross sections are located at different parts of the conduit depending on the different temperatures upon which depends the solubility of the other components in one or both counterflowing phases. A component of one and/ or of the other phase can be removed at each of said optimal or concentration zones whereby the component may be obtained in relatively pure and in gaseous state by subsequent boiling of the removed phase portion.

With the method according to the invention several components can be continuously and simultaneously separated in contradistinction to conventional methods which are based on the extraction by means of a foreign separating agent or are based on distillation. In the conventional distillation and extraction methods only one component can be separated continuously. Additional extraction and distillation apparatus must be provided for each additional component which must be separated or, if additional components must be separated in the same apparatus, separation of the first component must be completed or must be interrupted and the apparatus must be adapted to separate a second component, for example, by using a different extracting or separating agent.

It has been found that relatively few separating stages, about ten, are needed between the concentration zones and that this number is independent of the starting mixture.

The novel features which are considered characteristic of the invention are set forth with particularity in the appended claims. The inevntion itself, however, and additional objects and advantages thereof will best be understood from the following description of embodiments thereof when read in connection with the accompanying drawing, in which:

FIG. 1 is a diagrammatic longitudinal sectional view of a separating apparatus according to the invention.

FIG. 2 is a diagram showing the concentration of components to be separated in different zones of the apparatus shown in FIG. 1.

FIGS. 3 to 6 are diagrammatic sectional views of a detail of the apparatus shown in FIG. 1.

Referring more particularly to FIG. 1 of the drawing, numeral 7 designates a vertical conduit preferably filled with filling bodies 87 which are indicated by crosshatching. A supply conduit 31 is connected with the upper end of the conduit 7 for supplying the first phase which is preferably liquid. The conduit 31 may supply only a component of the first phase, namely essentially a carrier medium, preferably a carrier liquid. A discharge pipe 32 is connected with the top end of the conduit 7 for removing the second phase which is preferably gaseous. Only a component of the second phase, essentially a carrier medium, preferably a gas, may be removed through the pipe 32.

A discharge pipe 33 for the first phase or a component thereof, for example a carrier medium, and a supply pipe 34 for the second phase or a component thereof, for example a carrier medium, are connected with the bottom end of the conduit 7. The pipes 31 and 33 are connected outside of the column by a connecting pipe 1 in which a pump 3 and a metering device 5 are interposed. The pipes 32 and 34 are interconnected by means of a connecting pipe 2 in which a pump 4 and a flow meter 6 are interposed.

The conduit 7 is surrounded by a jacket 35 containing heat insulating material 29 and five heating devices 8 to 11 and 15, each of the latter including a container filled with a heat carrier, a heating element 36 for heating the heat carrier, a thermometer 37 for measuring the temperature of the heat carrier, and a stirrer 38 for agitating the heat carrier.

A supply pipe 16 provided with a valve 51 terminates in the conduit 7 between the heating devices 11 and 15 for supplying a mixture of several components which must be separated and which are dissolved in the two phases flowing in opposite direction through the conduit 7 to be subsequently individually separated.

The conduit 7 is provided with collars 12 to 14 individually placed between the heating devices 8, 9, 9, 10 and 10, 11, respectively. Relieve pipes 41, 42, 43 are individually connected with the collars 12 to 14, respectively. The relieve pipes 41 to 43 are provided with valves 44 to 46, respectively, and terminate in boilers 17 to 19, respectively, which are provided with heating devices 20 to 22, respectively. Relieve pipes 23 to 25 provided with valves 47 to 49, respectively, are connected with the vapor spaces of the boilers 17 to 19. The liquid spaces of the boilers 17 to 19 are individually connected with the vertical tube 7 by means of return pipes 26 to 28, respectively.

The apparatus operates as follows:

It is assumed that a mixture must be separated which consists of three components, for example, three higher fatty acids, perhaps of the propionic acid ($C_2H_5COOH$), the normal butyric acid ($C_3H_7COOH$), and the normal valeric acid ($C_4H_9COOH$). Before starting operation a certain amount of paraffin oil is filled into the apparatus, for example, through the pipe 16. Also introduced into the apparatus is an inert gas, for example nitrogen ($N_2$), for filling all spaces of the apparatus and driving the air therefrom. The paraffin oil and the nitrogen form carrier media for the components which are dissolved in the carrier media in dependence on the temperature and distributed among the carrier media accordingly.

It is essential to know the temperature dependability of the solubility of the three components to be separated in the carrier liquid, which is the paraffin oil. If these figures are not available, they must be measured. Knowing the temperature dependability of the solubility, the necessary velocities or amounts of the phases flowing per time unit through the tube 7 can be calculated and the temperatures at the concentraion zones 12, 13 and 14 can be ascertained.

In the example under consideration a temperature $T_1$ of 52° C. is maintained at and by the heating device 8. The device 9 maintains a temperature $T_2$ of 66° C., the device 10 a temperature $T_3$ of 90° C., the device 11 a temperature $T_4$ of 104° C., and the device 15 maintains a temperature $T_5$ of 160° C. Therefore, a temperature of substantially $$\frac{T_1+T_2}{2}=59° C.$$

is maintained at the collar 12, a temperature of substantially $$\frac{T_2+T_3}{2}=78° C.$$

is maintained at the collar 13, and a temperature of substantially $$\frac{T_3+T_4}{2}=97° C.$$

is maintained at the collar 14.

The temperature drop between the upper and the lower end of the tube 7 amounts to $T_5-T_1=108°$ C. This temperature drop is subdivided into four stages between the heating devices 8 to 11 and 15, namely: $T_5-T_4=56°$ C., $T_4-T_3=14°$ C., $T_3-T_2=24°$ C. and $T_2-T_1=14°$ C.

When the aforesaid temperatures are adjusted, the pumps 3 and 4 are started. The paraffin oil flows in a circuit including the elements 7, 33, 1, 3, 5, 31. The nitrogen flows in a circuit including the elements 34, 7, 32, 2, 6, 4. The flow velocities of the two carrier substances can be supervised by the flow meters 5 and 6. The pumps 3 and 4 are so operated that the desired flow velocities are produced, namely 0.4 ml. paraffin oil per minute and per cm.² flow area of the tube 7 and 1 liter nitrogen per minute and per cm.² flow area. When these flow velocities have been obtained a suitable amount of a mixture of liquid propionic acid, normal butyric acid, and normal valeric acid, in the present case about 1 mg. mixture, is added per gramme paraffin oil flowing through the tube 7.

Due to the relatively high temperature produced by the device 15 the whole mixture introduced through the pipe 16 is vaporized during normal operation. The three gaseous fatty acids are mixed with the nitrogen ascending in the tube 7 and form with the nitrogen the gaseous phase in the tube 7 and the mixture which is ready for separation of the components of the mixture. The gaseous fatty acid components of the ascending gas phase are in substance exchange relation with the descending paraffin oil. Depending on the temperature produced by the devices 11, 10, 9, 8, different amounts of the fatty acid components go over from the nitrogen into the paraffin oil, forming with the latter the liquid phase in the tube 7 which flows counter to the ascending gas phase.

The temperature characteristic of the solubility of the normal valeric acid in the paraffin oil is such that this acid is concentrated at the elevation of the collar 14. At the collar 13 the normal butyric acid is concentrated, while at the collar 12 the propionic acid is concentrated. This is shown in the diagram, FIG. 2 whose ordinates represent the elevations H of different cross sections of the tube 7 and whose abscissae show the relative concentrations or the amounts $m$ of the components which are present in a volume unit of the two phases. The solid line 55 shows the amount of the normal valeric acid, the dotted line 56 shows the amount of the normal butyric acid, and the dash-dot line 57 shows the amount of the propionic acid.

A portion of the liquid collected in the collars 12 to 14 is conducted through pipes 41 to 43, respectively, into the boilers 17 to 19, respectively, in which the concentrated components are vaporized. Therefore, the boiler 19 is maintained at or slightly above the boiling temperature of the normal valeric acid, i.e., at least at 174° C., the boiler 18 is maintained at a temperature of at least 164° C. which is the boiling temperature of the normal butyric acid, and the boiler 17 is maintained at least at the boiling temperature of the propionic acid, i.e., at least at 141° C. The vaporized part, i.e., the gaseous normal valeric acid in the boiler 19, the gaseous normal butyric acid in the boiler 18, and the gaseous propionic acid in the boiler 17, is removed through pipes 25, 24, 23, respectively, and the remaining liquid part, i.e., pure or almost pure paraffin oil, is returned to the exchange tube 7 through siphoning tubes 28, 27, 26, respectively, so that it will flow downwards in the tube 7 and is once more available to absorb gaseous parts of the three fatty acids which must be separated.

In a modification of the apparatus shown in FIG. 1 the components to be separated are removed from the paraffin oil in the boilers 17 to 19 by introducing a gas stream, for example nitrogen, through a supply pipe 88, as shown in FIG. 5. In this case the paraffin oil need not be heated to the boiling temperature of the respective component and expelling of the component is effected at a lower temperature.

In another modification which is illustrated in FIG. 6, enriched components are removed from the gaseous phase. For this purpose removal devices may be provided whose elevation can be changed. For example, discharge pipes 81 of which only one is shown in FIG. 6, may be provided which can be moved more or less far into the tube 7, coaxially thereof and sealed against the tube by a seal 83. The pipes 81 which correspond to the pipes 41 to 43 in FIG. 1 and which may be connected to a suction pump 82 may be axially movably inserted through the bottom or through the top of the tube 7. Each pipe 81 is pushed so far into the tube 7 that the end 84 of the pipe is placed in a cross section of the tube 7 where there is an enrichment of the respective component. If other components from other mixtures must be separated in the apparatus the elevation of the pipes 81 is so adjusted that their inlet ends 84 are at the elevation where these other components are concentrated. The pipes 81 may be movable in a permeable, for example strainerlike, cylinder 85 which separates the pipes 81 from the filling bodies 87. If no filling bodies are provided, the cylinder 85 may be omitted.

In the described example of separating propionic acid, normal butyric acid and normal valeric acid, the inlet end 84 of a first pipe 81 is moved to the elevation of the collar 12 in FIG. 1, the inlet end of a second pipe 81, not shown in FIG. 6, is moved to the elevation of the collar 13, and the inlet end of a third pipe 81 is moved to the elevation of the collar 14. If desired, some of the pipes 81, for example two pipes, may be inserted through the top of the tube 7 and the third pipe may be introduced through the bottom of the tube 7. The enriched gaseous components removed through the pipes 81 may be conducted through a cooler 86 in which they are condensed. The condensate is conducted into boilers heated to a suitable boiling temperature wherein the component to be separated is evaporated and removed to the outside similarly to what is done in the boilers 17 to 19 shown in FIG. 1. The remaining carrier nitrogen is returned to the tube 7 through pipes corresponding to the pipes 26 to 28 in FIG. 1.

Whereas in the described method of separating higher fatty acids which method is based on the separation of the gaseous fatty acids from nitrogen, the pressure in the tube 7 amounts to 1 atmosphere absolute, the method may be modified by operating at higher pressures.

The product of the concentration of a component in the phase moving from an end 61 or 62 of the tube 7 towards the center 63 of the tube times the volume of the phase flowing per time unit towards the center 63 (i.e. the amount of the component transported per time unit towards the middle 63 of the tube 7) must always be greater than the product of the concentration of the same substance in the other phase which flows from the center 63 towards an end of the tube 7 times the volume of the other phase flowing per time unit from the center of the tube, i.e., it must be greater than the amount of the component flowing per time unit from the center 63. This can be effected by suitable selection of the carrier substances which have a suitable temperature characteristic for the solubility of the components and by suitable choice of the temperatures produced by the heating devices 8 to 11 and 15 and by suitable choice of the flow velocities of the two phases in the tube 7. In the described example the product of the concentration, for example, of the propionic acid in the liquid phase flowing from the top 61 towards the middle 63 of the tube 7 times the volume of the liquid phase flowing downwards per minute is greater than the product of the concentration of the propionic acid in the gas phase flowing in the opposite direction, i.e. away from the tube center 63, times the volume of the gas phase flowing upwards per minute. At the bottom end 62 of the tube 7 the product of the concentration of the propionic acid in the gas phase flowing towards the tube center times the volume of the upwardly flowing gas phase is greater than the product of the concentration of the propionic acid in the liquid phase which flows in opposite direction, away from the tube center 63, times the volume of the liquid phase flowing downwards. In this way the components to be separated always flow from the ends towards the center of the tube so that concentration zones for the individual fatty acid components are produced within the tube 7.

Instead of using one tube 7 a plurality of such tubes may be arranged in parallel relation whereby the tubes may extend through common heating devices. If desired, the tube or tubes 7 may be placed in a position other than vertical, for example, in horizontal position.

If more than three components must be separated simultaneously and continuously, a correspondingly greater number of collecting collars or equivalent devices and of heating devices must be provided. Instead of conducting a liquid and a gaseous phase in counterflow relation through the exchange tube 7, for example, two liquid phases which are not miscible may be conducted through the tube in counterflow relation whereby also concentration zones according to FIG. 2 are produced from which concentrated components may be removed from one or the other or from both liquid phases.

If the carrier substances are not or are not all returned from the boilers 17 to 19 to the tube 7 or, for some reason, cannot be returned, a corresponding amount of carrier substances must be fed into the proper zones of the tube 7. There need not be closed circuits for the two carrier substances. For example, fresh paraffin oil and fresh nitrogen may be continuously supplied through the pipes 31 and 34 and both carrier media may be continuously removed from the system through the pipes 33 and 32.

It is also possible to introduce through the pipe 16 a mixture of a carrier substance and the components to be separated, for example a mixture of paraffin oil, propionic acid, normal butyric acid, and normal valeric acid whereby all or part of the components go over into the other phase, namely, the carrier nitrogen downstream of the connection of the pipe 16 with the tube 7, the rest of the liquid phase leaving the tube 7 through the pipe 33 and, if desired, being reintroduced through the inlet 31. The pipe 16 may be connected with the tube 7 at a locality other than the one shown in the drawing or it may be connected with one of the two circuits 33, 1, 31, 7 and 32, 2, 34, 7.

In the described example in which a liquid and a gaseous carrier medium is used and, therefore, a liquid and a gas phase is present in the tube 7 the solubility of the components to be separated in the carrier liquid generally becomes smaller with rising temperature and becomes greater at lower temperatures so that in zones of higher temperature in the tube 7 the gas phase contains a greater amount and the liquid phase contains a smaller amount of the components to be separated whereas in zones of lower temperature in the tube 7 the liquid phase contains a greater amount and the gas phase a smaller amount of components to be separated. The temperature characteristic of the solubility is not the same for different components to be separated.

For separating a mixture of several components, for example of the liquid mixture introduced through the pipe 16 and containing propionic acid, normal butyric acid and normal valeric acid, the mixture must first be added to a carrier substance, for example nitrogen. The resulting mixture forms one phase, for example the gas phase, which is conducted in the tube 7 in counterflow relation to a second phase, for example the paraffin oil, for substance exchange so that the individual components of the mixture initially introduced through the pipe 16 can be separated from the liquid phase. A mixture of components must usually be added to a carrier substance for all components before the separation can be effected.

In the structural arrangement shown in FIG. 3 the tube 7 is provided with a plurality of, for example ten, perforated plates 71 of which only three are shown in FIG. 3. The liquid phase which flows downwards in the tube 7 flows through pipes 72 from one plate to the plate below. While on the perforated plates 71, the liquid is permeated by the gas phase which flows upwards through the perforations of the plate. Adjacent to and below each perforated plate are heating or cooling elements in the form of pipes 73 for maintaining the plate and the liquid and gas phase thereat at a predetermined temperature. In this way a constant temperature drop is maintained along the tube 7. From the top of those perforated plates where the component to be separated is concentrated, a portion, for example of the liquid phase, is removed through a pipe 74 which corresponds to the pipes 41 to 43 in FIG. 1. After separation of the component from the concentrated mixture by means, not shown, the remainder of the liquid is returned to a suitable part of the tube 7 as is done by the pipes 26 to 28 in FIG. 1.

In the embodiment illustrated in FIG. 4, a plurality, for example ten, bubble trays 75 are built into the tube 7. Each tray consists of a plurality of containers 76 and bell-shaped cover elements 77 placed upside down thereabove. The downwards flowing liquid phase passes through the trays 75 and through pipes 72 from one tray to the tray below. At the same time the upwards flowing gas phase passes between the containers 76 and is diverted by the elements 77 into the liquid phase, effecting the substance exchange. Adjacent to and below each bubble tray 75 heating or cooling tubes 73 are arranged for maintaining each tray at a predetermined temperature. The temperatures of the different trays are different so that a predetermined temperature drop is maintained along the tube 7. Depending on the temperature, a different component to be separated will be concentrated at different trays and a portion of the concentrated phase is removed through a pipe 74 from the respective tray. After separation of the respective component from the mixture in which it is concentrated outside of the tube 7, for example, by means corresponding to the boilers or separators 17 to 19 in FIG. 1, the remaining liquid is returned to a suitable part of the tube 7 as is done in FIG. 1 through the pipes 26 to 28.

Whereas the heating devices in the apparatus shown in FIG. 1 maintain the desired temperatures in the tube 7 by adding to or removing heat from the outside of the tube, the embodiments shown in FIGS. 3 and 4 add or remove heat at the inside of the tube 7.

What is claimed is:

1. Process for the separation of a liquid mixture of at least two components which comprises introducing said mixture into a system in which two immiscible fluid phases are each maintained in a uniform, continuous countercurrent flow, one of said phases being a liquid and the other an inert gas, the components forming said mixture being soluble in each of said fluid phases with their relative solubilities in the respective countercurrently flowing phases being a function of the temperature of the respective phases, maintaining a fixed and predetermined temperature gradient in said system by controlling the thermal energy available to separate zones thereof whereby the relative solubility and concentration of each of the components in the separate phases will vary along the length of the system so that at a plurality of intermediate points corresponding in number to the number of components being separated the product of the concentration of a component at that point in each of the countercurrently flowing phases multiplied by the volume of that phase passing that point will be equal, maintaining the product of the concentration of the component to be separated in the phase flowing toward the center of the system multiplied by the volume of said phase greater than the product of the concentration of the component to be separated in the phase flowing from the center of said system multiplied by the volume of said phase, and at each of the intermediate points separating a part of at least one of the countercurrently flowing phases together with the component soluble therein.

2. Process in accordance with claim 1 wherein the parts of at least one of the counterflowing phases together with the components soluble therein, separated at each of the intermediate points are each distilled, the component desired being stripped off and the circulating liquid phase being returned to the system at substantially the same point at which it was removed.

(References on following page)

References Cited in the file of this patent

UNITED STATES PATENTS

| | | |
|---|---|---|
| 2,086,487 | Bahlke et al. | July 6, 1937 |
| 2,148,716 | Whiteley et al. | Feb. 28, 1939 |
| 2,161,405 | Brown | June 6, 1939 |
| 2,367,671 | Dickinson et al. | Jan. 23, 1945 |
| 2,451,433 | Davis | Oct. 12, 1948 |
| 2,647,862 | Whitney | Aug. 4, 1953 |
| 2,661,812 | Gilmore | Dec. 8, 1953 |
| 2,690,060 | Legatski | Sept. 28, 1954 |
| 2,753,386 | McCaulay et al. | July 3, 1956 |
| 2,782,148 | Geiger | Feb. 19, 1957 |
| 2,783,191 | De Vries | Feb. 26, 1957 |
| 2,820,700 | Saxton | Jan. 21, 1958 |
| 2,872,295 | Pohlenz | Feb. 3, 1959 |
| 2,952,631 | Hausch | Sept. 13, 1960 |